Oct. 2, 1962

A. H. ROBSON 3,056,554

AIR HEATER FUEL CONTROL SYSTEM

Filed Sept. 11, 1958

INVENTOR.
AUBREY H. ROBSON

BY Edward C. Arney

ATTORNEY

United States Patent Office 3,056,554
Patented Oct. 2, 1962

3,056,554
AIR HEATER FUEL CONTROL SYSTEM
Aubrey H. Robson, Rock Island, Ill., assignor to American Air Filter Company, Inc., Louisville, Ky., a corporation of Delaware
Filed Sept. 11, 1958, Ser. No. 760,359
7 Claims. (Cl. 236—10)

This invention relates to portable air heaters employing liquid fuel and relates particularly to a fuel control system for such a heater.

Hubbard U.S. Patent 2,758,591, issued August 14, 1956, exemplifies a portable space heater used extensively for supplying heated air for a multitude of purposes. One specific and extensive utilization of such a heater has been as a ground support heater for pre-heating aircraft and their engines prior to take-off. The present invention is directed to a fuel control system for an air heater of this general type.

While the control system described and claimed in the aforementioned patent has proved to be eminently satisfactory in service, it has certain limitations. Thus, whereas the commercial embodiment of that air heater provided a discharge air temperature control range corresponding to a combustor turn-down ratio of approximately 8 to 1, it is mandatory with certain present advanced aircraft to provide a discharge air temperature control range corresponding to a combustor turn-down ratio exceeding 100 to 1.

Such a wide turn-down ratio is necessary since these advanced aircraft operate in localities with ambient air temperatures of as low as minus 65 degrees F. and as high as 125 degrees F. Thus, to provide a given ventilating air outlet temperature requires a vastly different fuel burning rate depending upon the ambient air temperature in the particular locality where the heaters are employed. Additionally, the ventilating air outlet temperature must be controllable within a relatively wide control band.

One object of the present invention is the provision of a fuel control system which meets such requirements.

Another object is the provision of such a system wherein a throttling valve is controlled to provide an air discharge temperature within a relatively higher air discharge temperature range, and a second or by-pass valve is controlled to provide an air discharge temperature within a relatively lower temperature range.

Another object is the provision of means for automatically switching from a modulating type of control of the throttling valve to an open-closed type of control of the second valve.

These and other objects are attained in accordance with the present invention by providing a system wherein fuel flow is controlled by modulating the fuel discharge into the burner between maximum combustor heat output and the minimum combustor heat output consistent with a stable minimum flame to obtain an air discharge temperature within a relatively higher range, and then, to obtain an air discharge temperature below that obtainable with a minimum stable flame, controlling heat output by alternately cutting the fuel flow to the burner on and off in accordance with the temperature control demand.

This "method switching" temperature control is obtained in a relatively simple manner and without an unduly complicated system as will be apparent from the following specification taken in connection with the accompanying drawing illustrating a preferred embodiment of the invention by way of example, and wherein.

Figure 1:
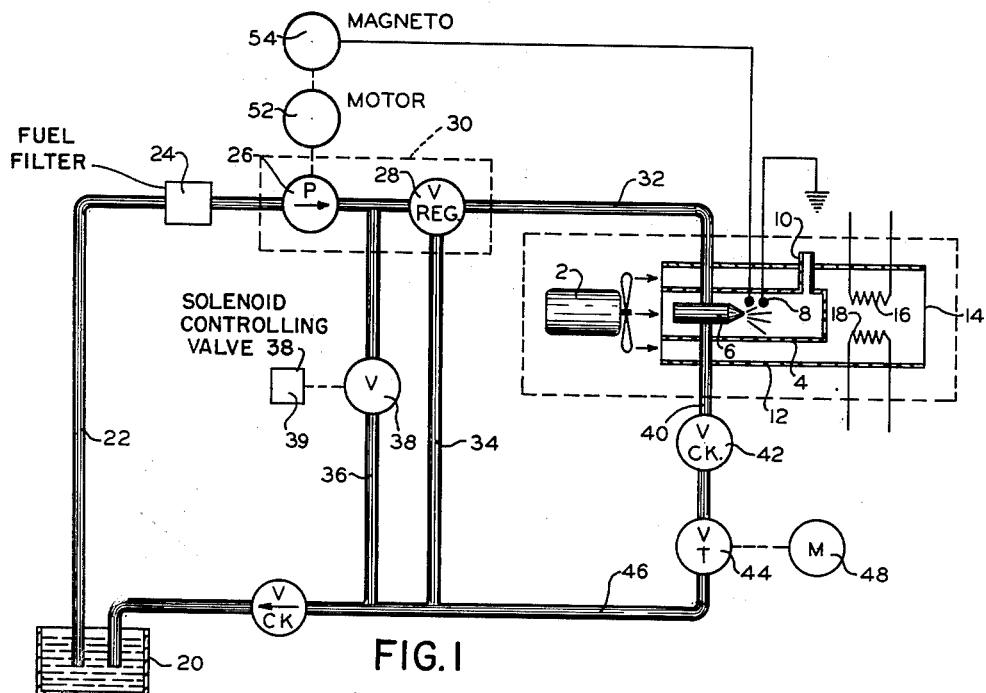
FIGURE 1 is a diagrammatic view illustrating the heater fuel flow system and certain elements associated therewith for controlling fuel flow and heater operation.

The combustion and air heating system is of the general type illustrated in Hubbard U.S. Patent 2,758,591, issued August 14, 1956, and as shown diagrammatically in FIGURE 1 comprises: forced air blower means 2 to provide ventilating air and combustion air; a combustion chamber-burner 4 adapted to receive combustion air from the blower 2 and liquid fuel from jet nozzle 6, the burner also containing igniting spark electrodes 8 and communicating with an exhaust stack 10 for discharging the exhaust gases; an outer jacket 12 defining a heat exchanging passageway between the combustion chamber and the outer jacket so that the ventilating air may be heated in its pasage therethrough, the outer jacket terminating in an air outlet 14 through which ventilating air is discharged into suitable conveying ducts for delivery to the serviced space; and a temperature control sensing element 16, and a temperature overheat sensing element 18, both of which are asociated with Wheatstone bridge circuits to be hereinafter described in some detail.

The fuel flow system will now be described. Fuel is drawn from tank 20 through conduit 22 and the fuel filter 24 by pump 26. A regulating valve 28 on the discharge side of pump 26 is a conventional balanced regulating type valve within housing 30 and is adapted to open and to supply fuel at a predetermined pressure to nozzle supply conduit 32. When the regulating valve 28 opens, fuel flows at that predetermined pressure (e.g., 150 p.s.i.) through conduit 32 to nozzle 6. Secondary by-pass conduit 34 returns fuel, in excess of that required to maintain a steady 150 p.s.i. in nozzle conduit 32, back to tank 20. Primary by-pass conduit 36 contains a two-position (open-closed) valve 38 controlled by solenoid 39.

Burner nozzle 6 is of the by-pass type which permits an operation wherein the rate of fuel discharged into the burner through nozzle 6 is controlled by throttling on the downstream side of the nozzle. Such a burner nozzle is illustrated and described in detail in Hubbard U.S. Patent 2,758,591 and includes a supply chamber into which fuel from conduit 32 flows, a combustion jet orifice through which some of the fuel escapes as a spray or jet into the burner, and a by-pass chamber which receives the rest of the fuel. With fuel supplied by conduit 32 at a constant pressure to the nozzle, part of the fuel will be discharged through the jet orifice into the burner chamber and part of it will by-pass to the by-pass chamber. The by-pass chamber connects to the nozzle by-pass conduit 40 which contains a check valve 42 and a throttling valve 44. Thus, in operation, the more the nozzle by-pass conduit is throttled by valve 44, the more fuel is discharged through the nozzle jet orifice; and conversely, the less the jet by-pass conduit is throttled, the less fuel issues through the nozzle jet orifice. The downstream side of the throttling valve 44 is connected to pass excess fuel back to the tank 20 by way of return conduit 46. The throttling valve is modulated between end travel limits by reversible motor 48 which, in turn, is controlled in a manner to be described hereinafter.

Fuel pump 26 is driven by electric motor 52 which also drives the ignition magneto 54 electrically connected to supply power for the igniting spark between electrodes 8 at the nozzle orifice. This insures an igniting arc at the nozzle at all times when the fuel pump is operating.

As will be apparent hereinafter from the description of the circuit utilized to control the fuel flow system, the solenoid operated valve 38 is maintained in a closed position by energization of solenoid 39 while the throttling valve 44 is being modulated between its end travel positions. Valve 38 is biased to an open position when the solenoid 39 is de-energized. Thus, while the valve 38 is closed and the throttling valve 44 is between its end travel limits, the rate of fuel discharge from nozzle 6 into the burner is entirely under the control of the throttling valve 44.

Figure 2:
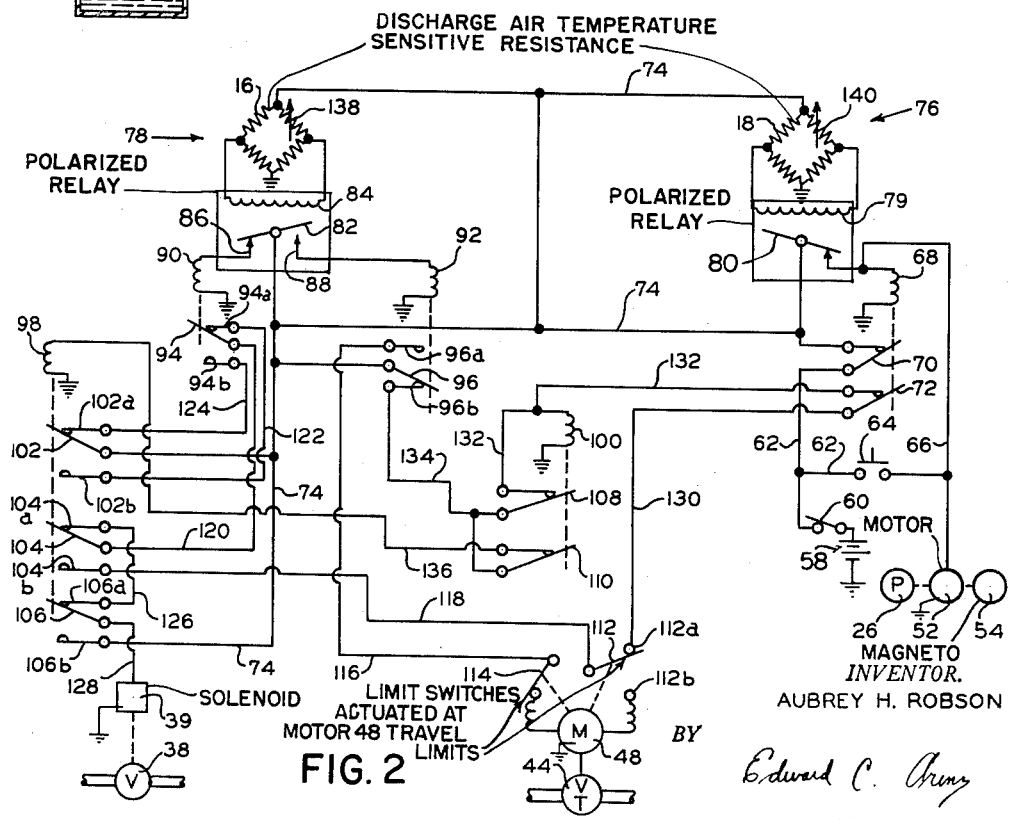
FIGURE 2 is a diagram of an electrical circuit adapted to provide the control for that part of heater operation to which this invention is directed.

Referring now to FIGURE 2, a suitable power source 58 is connected through main switch 60 to provide power through line 62 to one side of normally open, manually closable switch 64. Closure of switch 64 energizes line 66, relay winding 68, and motor 52 which drives fuel pump 26 and ignition magneto 54. Energization of relay winding 68 operates both relay actuated switches 70 and 72 to the position illustrated in FIGURE 2 and thus through switch 70 line 74 serves to energize overheat bridge circuit 76 and temperature control bridge circuit 78. Energization of overheat bridge 76 causes current to flow through polarized winding 79 in a direction causing closure of overheat switch 80 and thereby completes the alternate circuit for energizing relay winding 68. Thus, when switch 64 is released by the heater operator, relay winding 68 remains energized through the overheat cut-off switch 80 and relay actuated switch 70, and motor 52 remains energized through line 66.

Switch 82 is controlled by current flow from temperature control bridge 78 through polarized relay 84. Switch 82 is biased towards a neutral position and is out of contact with its cooling contact 86 and heating contact 88 when current flow through polarized relay 84 in either direction is below a predetermined value. It is noted at this time that the expressions "cooling contact" and "cooling winding" are used herein in the sense of reducing heat rather than implying any means for refrigeration, artificial cooling, or the like. Current flow in one direction above this predetermined value will cause switch 82 to close to cooling contact 86 and thereby energize relay winding 90. Current flow in the opposite direction above the predetermined value will cause switch 82 to close to heating contact 88 and thereby energize relay winding 92.

Energization of relay winding 90, which may be characterized as the cooling winding, actuates switch 94 to its 94a position as shown in FIGURE 2 and indicates the bridge circuit 78 is demanding a lower ventilating air discharge temperature. Energization of relay winding 92, which may be characterized as the heating winding, actuates switch 96 to its 96a position or opposite to the position shown in FIGURE 2 and indicates the bridge circuit 78 is demanding a higher ventilating air discharge temperature. It will be apparent that both windings 90 and 92 cannot be energized at the same time and that while bridge 78 is in substantial balance, thereby indicating the ventilating air discharge temperature is relatively close to the desired temperature, neither winding 90 nor 92 will be energized.

Relay windings 98 and 100 may be characterized as holding relay windings normally energized only during the time that on-off fuel flow control is being employed. Energization of relay winding 98 actuates switches 102, 104 and 106 to their "a" contact positions. Energization of relay winding 100 actuates switches 108 and 110 to their closed positions as illustrated in FIGURE 2.

Switches 112 and 114 in the circuit to motor 48 are limit switches which are actuated by travel of motor 48 to its end travel limits. Switch 112 is actuated from its 112b position to its 112a position when motor 48 is driven to its end travel position corresponding to a maximum open (minimum stable flame-supporting fuel rate) position of throttle valve 44. Switch 114 opens when motor 48 is driven to its opposite end travel position corresponding to a maximum closed (maximum fuel rate to burner) position of throttle valve 44.

One side of switch 114 is connected by line 116 to contact 96a of switch 96. Since the actuated element of switch 96 is connected to power line 74, when switch 96 is energized to its 96a contact by energization of heating relay winding 92, the motor 48 will be energized and operated in a direction to close throttle valve 44 and consequently throttle nozzle by-pass conduit 40.

When switch 112 is in its 112b contact position, and cooling relay winding 90 is energized and holding relay winding 98 is de-energized, the motor 48 is connected by line 118, switch 104 in its 104b position, line 120, switch 94 in its 94a position, line 122, and switch 102 in its 102b position to power line 74 and the motor 48 will be energized and driven in a direction to open throttle valve 44 and consequently increase the quantity of fuel by-passed through nozzle by-pass conduit 40.

Contact 94b is connected by line 124 to contact 102a, contact 104a is connected by line 126 to contact 106a and operable arm of switch 106 is connected by line 128 to solenoid 39 which controls primary by-pass valve 38.

Contact 112a of limit switch 112 is connected by line 130 to one side of switch 72 which has its other side connected to holding relay winding 100 by line 132. Line 132 is also connected to one side of switch 108 which has its other side connected by line 134 to terminal 96b of switch 96 and to one side of switch 110. The other side of switch 110 is connected by line 136 to holding relay winding 98.

Bridge circuit 78 includes the air discharge temperature sensing resistor 16 in one leg of the bridge and a variable temperature selection resistor 138 in another leg of the bridge. Overheat bridge 76 includes the overheat air discharge temperature sensing resistor 18 in one leg of the bridge and an overheat temperature selection resistor 140 in another leg of the bridge. Both bridges 76 and 78 operate in a conventional manner wherein the direction and magnitude of current flow through the polarized relay windings 79 and 84 is dependent upon the resistance differential between the sensing and the selection resistors.

*Operation*

The operation of the heater and control of fuel flow will now be described. After ventilation and combustion air flow is initiated, closure of switch 60 delivers power to one side of switch 64 which is then closed to energize relay windings 68 and motor 52. Energization of relay winding 68 actuates switches 70 and 72 to their positions shown in FIGURE 2 so that relay winding 68 will remain energized through overheat safety switch 80 after momentary closure switch 64 is released. With switches 70 and 72 closed, power is delivered by line 74 to both of the bridges, to the temperature control switch 82 and to various other switches as shown in FIGURE 2.

For purposes of explanation, assume that motor 48 and valve 44 are in an intermediate position, that limit switch 114 is closed, and limit switch 112 is in its contact 112b position so that the motor 48 may be energized for movement in either direction. While a slow fire start of the heater may be accomplished through utilization of additional circuitry described and claimed in my co-pending application Serial No. 764,170, filed September 29, 1958, now Patent No. 2,979,264, it has been deleted from this specification to simplify explanation of this system.

It is assumed that the desired air temperature has been selected by adjusting resistor 138, and that the temperature sensed by resistor 16 is considerably below this value. Thus, current flow through polarized relay 84 will be of a magnitude and in a direction to close switch 82 to its heat contact 88. This energizes relay winding 92 which thereby actuates switch 96 to its 96a position so that power is delivered from line 74 to motor 48 through line 116 and motor 48 is driven in a direction to close throttling valve 44 and thereby increase the fuel discharge from nozzle 6 into the burner. After the heated air discharged from the heater has reached a temperature corresponding to that selected by the resistor 138, switch 82 will break from heating contact 88 and move towards its neutral position since the resistance of element 16 and element 138 will be nearly equal and current flow through polarized relay winding 84 will be insufficient to maintain contact 88 or 86. Motor 48 is then in a de-energized condition and throttle valve 44 will remain in that particular position until conditions change.

If the temperature sensed by resistor 16 exceeds that temperature selected by resistor 138, current flow through polarized relay winding 84 will be in a direction to tend to close switch 82 to its cooling contact 86. Closure of switch 82 to cooling contact 86 results in energization of cooling relay winding 90 and actuation of switch 94 to its 94a position. Motor 48 is then energized in a cooling direction (opening throttle valve 44) and from line 74 by way of switch 102 at its 102b contact, line 122 to switch 94 at its 94a contact, line 120 to switch 104 at its 104b contact, line 118 and limit switch 112 in its 112b contact position. When the temperature sensed by resistor 16 decreases sufficiently, switch 82 will break from cooling contact 86 and the motor 48 is again de-energized.

If the temperature sensed by overheat sensing resistor 18 exceeds that selected by overheat selection resistor 140, current flow through polarized relay winding 79 associated with overheat bridge 76 will cause switch 80 to open. Thus, relay winding 68 is de-energized, switches 70 and 72 open, and combustion is terminated.

In the operation of the heater of the present invention, it is sometimes necessary to furnish a heated air discharge having a temperature only slightly above the temperature of the ambient air drawn into the heater. In the attempt of the control to decrease fuel flow into the burner to a sufficiently small quantity to only slightly heat the air, the motor 48 will be driven to a position wherein throttling valve 44 is at its maximum open position. The limit switch 112 will be actuated automatically to its 112a position when motor 48 reaches this end travel position. Actuation of switch 112 to its 112a position coupled with switch 82 being in its cooling contact 86 position (thus indicating that the air discharged from the heater still exceeds the desired temperature even though the motor 48 has driven throttle valve to its maximum open position) is used to trigger the method of operation wherein by-pass valve 38 is alternately opened and closed in accordance with the discharge air temperature demands.

Thus, when switch 112 operates to its 112a position and switch 82 remains in its cooling contact 86 position, power is delivered to energize relay 100 by way of the following path. Line 74 delivers power to switch 102 in its 102b contact position, through line 122 to switch 94 in its 94a position, through line 120 to switch 104 in its 104b position, through line 118 to switch 112 in its 112a position, through line 130, switch 72 and line 132 to energize holding relay winding 100. Energization of relay winding 100 operates switches 108 and 110 to a closed position. When switches 108 and 110 are actuated to their closed positions, holding relay winding 98 is also energized through switch 96 in its 96b position, line 134, switch 110, and line 136. When relay winding 98 is energized, switches 102, 104 and 106 are all actuated to their "a" positions. As soon as 106 is actuated to its 106a position, the circuit to solenoid 39 is opened and valve 38, which is biased to an open position when solenoid 39 is de-energized, moves to an open position which by-passes all fuel through primary by-pass conduit 36 back to the tank. In other words, when by-pass valve 38 opens, fuel flow to the nozzle 6 through supply conduit 30 is terminated and combustion ceases.

With no fire in the burner, the outlet air temperature decreases and this decrease is sensed by resistor 16. When the resistance of the resistors 16 and 138 tend to balance because of the decreased outlet air temperature, current flow through the polarized relay 84 decreases sufficiently to cause switch 82 to open from cooling contact 86, relay winding 90 is de-energized and switch 94 moves to its 94b position. When switch 94 moves to its 94b position, the solenoid 39 is again energized through line 128, switch 106 in its 106a position, line 126, switch 104 in its 104a position, line 120, switch 94 in its 94b position, line 124, switch 102 in its 102a position, and power line 74. Thus, minimum burner fire is re-established in the heater by causing a fuel discharge from the nozzle which is just sufficient to maintain the lowest stable flame.

If the minmum burner fire again causes the discharge air temperature to increase above the selected value, switch 82 will again close to cooling contact 86 and, through the circuits heretofore described, will cause the by-pass valve 38 to again open, by-pass all fuel and extinguish burner flame. This alternate open-closed operation of by-pass valve 38 will continue as long as the temperature demanded by the control system can only be maintained by this type of operation.

If the alternate open-closed operation does not suffice to provide enough heat to obtain the desired air outlet temperature, this will become apparent to bridge 78 and switch 82 will be operated by the current flow through polarized relay 84 to its heating contact position 88. This will energize relay winding 92 and actuate switch 96 to its 96a position. When so actuated, the motor 48 is moved from its cooling end travel position by power delivered from line 74 through switch 96, through line 116 and limit switch 114. As soon as motor 48 is driven from its cooling end travel position, limit switch 112 is thereby operated to its 112b position, the holding relay winding 100 is de-energized, and consequently holding relay winding 98 is also de-energized by opening switch 108. Since solenoid 39 is energized as soon as switch 82 opens from cooling contact 86, it is insured that by-pass valve 38 is closed and a minimum burner fire is established before switch 82 is moved to its heating contact position 88. When holding relay winding 98 is de-energized, switch 106 moves back to its 106b position and solenoid 39 is again energized directly from line 74 through the switch 106. This insures that when the switch 82 moves away from its heating contact 88 (which occurs when the temperature control bridge is again satisfied) the by-pass valve 38 will remain in a closed position as motor 48 modulates throttle valve 44 back and forth in accordance with temperature demands manifested by the temperature control bridge 78.

By means of the described arrangement, it will be noted that switch 82 operates to control fuel flow by actuating motor 48 whenever modulation of motor 48 and valve 44 between end travel positions will serve to satisfy the demands of the system, and also serves as the control for on-off fuel flow control to the burner when the temperature demands of the system cannot be satisfied by a modulating type of operation.

Having described my invention, I claim:

1. In a liquid fuel burning air heater: a liquid fuel source; a burner having a fuel discharge nozzle of the bypass type; fuel supply means including a main conduit for supplying fuel at a relatively constant pressure to said burner; a bypass conduit for bypassing fuel around said burner; a fuel return conduit connected to said nozzle for returning fuel which bypasses through said nozzle to said source; throttling valve means in said fuel return conduit operable between a predetermined open and a closed position to vary fuel back pressure in said return conduit and consequently vary the rate at which fuel is discharged into said burner between a minimum-stable-flame-supporting position and a maximum flame position respectively; a by-pass valve in said by-pass conduit operable to by-pass fuel around said burner when open, and to prevent said by-pass of fuel when closed; and control means for said throttling valve and for said by-pass valve operative in response to a differential between a sensed discharge air temperature produced by said burner and a selected air temperature, said control means including a single temperature sensing means controlling switch means operative in a relatively higher discharge air temperature range to modulate said throttling valve between said open and said closed positions for varying fuel discharged into said burner and to maintain said by-pass valve in said closed position, and in a relatively lower discharge air temperature range to maintain said throttling valve in said open position and to open and close said by-pass valve in response to a sensed air temperature above and below said selected air temperature respectively.

2. In a liquid fuel burning air heater: a liquid fuel source; a burner having a fuel discharge nozzle of the bypass type; main conduit means for supplying fuel at a relatively constant pressure to said burner; a bypass conduit connected to said main conduit; a fuel return conduit connected to said nozzle for returning fuel which bypasses through said nozzle to said source; a throttling valve in said fuel return conduit for controlling fuel flow into said burner by varying fuel back pressure; a bypass valve in said bypass conduit; a single air temperature sensitive means including switch means controlled thereby for controlling said throttling valve and said by-pass valve in response to the differential between a sensed discharge air temperature produced by said burner and a selected air discharge temperature; limit switch means operative, in response to operation of said throttling valve to a position corresponding to a minimum flame-supporting flow of fuel into said burner and to a simultaneous condition of said air temperature sensitive means indicative of a decreased discharge air temperature need, to render circuit means for controlling said by-pass valve in an on-off operation effective, and to prevent operation of said throttling valve to a position beyond said minimum flame-supporting position; and, aditional switch means in said by-pass valve control circuit means operative, in response to a condition of said air temperature sensitive means indicative of a decreased discharge air temperature need, to open said by-pass valve, and in response to a condition of said air temperature sensitive means indicative of an increased discharge air temperature need within a predetermined limit to close said by-pass valve.

3. The system of claim 2 including: means operative, in response to a condition of said air temperature sensitive means indicative of an increased discharge air temperature need above said predetermined limit, to render said by-pass valve control circuit means inffective for an on-off operation, and to operate said throttling valve in a direction to increase fuel flow beyond said minimum flame-supporting position.

4. The system of claim 3 wherein: the operation of the system is effected by operation of said limit switch means when said throttling valve is moved to a position corresponding to fuel flow into said burner exceeding said minimum flame-supporting flow.

5. A fuel combustion and control system for an air heater, comprising: a fuel source; a fuel burner having a bypass type nozzle; means including a main supply conduit for supplying fuel from said source to said nozzle at a relatively constant pressure; a fuel return conduit connected to said nozzle for receiving fuel bypassed through said nozzle; a throttling valve in said return conduit operable in an opening direction for decreasing fuel back pressure in said return conduit and consequently decreasing the rate of fuel discharge from said nozzle into said burner, and alternatively in a closing direction for increasing fuel back pressure in said return conduit and consequently increasing the rate of fuel discharge from said nozzle into said burner; electrically powered motorized means for operating said throttling valve in said opening, and alternatively in said closing, direction; first circuit means for energizing said motorized means in said alternative directions, said circuit means including first switch means responsive to a heater discharge air temperature produced by said burner exceeding a selected temperature to close one way for energizing said motorized means in a throttling valve opening direction, and responsive to a heater discharge air temperature produced in said burner below said selected temperature to close in another way for energizing said motorized means in a throttling valve closing direction; a bypass conduit connected to said main supply conduit and to said fuel source, said bypass conduit including a solenoid valve having a de-energized, open position permitting fuel return to said source and thereby preventing fuel flow to said nozzle, and an energized, closed position preventing fuel return therethrough and thereby directing fuel flow to said nozzle; second switch means having a first position for energizing and maintaining energized said solenoid valve irrespective of the position of said first switch means, and a second position in which energization of said solenoid valve is controlled in accordance with the position of said first switch means; limit switch means in said first circuit means operable, in response to said throttling valve being in a predetermined open position corresponding to a minimum flame supporting rate of fuel discharge into said burner, to open said first circuit means for preventing energization of said motorized means in a further throttling valve opening direction, and simultaneously to energize second circuit means for operating said second switch means to said second position; and third circuit means including third switch means operable, in response to closure of said first switch means said one way to de-energize said solenoid valve, and in response to opening of said first switch means from said one way position, to energize said solenoid valve.

6. In a liquid fuel burning air heater: a liquid fuel source; a burner having a fuel discharge nozzle of the by-pass type; conduit means for supplying fuel from said source at a predetermined pressure to said burner; a nozzle return conduit connected to said nozzle and adapted to return fuel bypassed therethrough; a throttling valve for varying the fuel discharge rate into said burner; a by-pass conduit connected to said supply conduit means; a by-pass valve in said bypass conduit operable in an open position to shunt fuel around said burner; a single means responsive to a sensed air discharge temperature produced by said burner above a selected air discharge temperature to close a first switch one way to operate said throttling valve in an opening direction, and responsive to a sensed air discharge temperature produced by said burner below said selected air discharge temperature to close said first switch another way to operate said throttling valve in a closing direction; limit means to prevent operation of said throttling valve beyond a position corresponding to a maximum open position adapted to support a minimum stable flame in said burner; circuit means energized in response to operation of said limit means and to a coincident sensed air discharge temperature produced by said burner below said selected air discharge temperature to open said bypass valve; said circuit means including second switch means operative in accordance with operation of said first switch and while said throttling valve is in said maximum open position, to open and close said bypass valve in response to a sensed air discharge temperature produced by said burner respectively below and above said selected temperature.

7. The fuel control system of claim 6 wherein: said circuit means includes switch means for de-energizing said circuit means and closing said bypass valve in response to operation of said throttling valve away from its maximum open position.

References Cited in the file of this patent

UNITED STATES PATENTS

| | | |
|---|---|---|
| 2,004,597 | Birtch | June 11, 1935 |
| 2,317,640 | Ray | Apr. 27, 1943 |
| 2,724,409 | Coffey | Nov. 22, 1955 |
| 2,758,591 | Hubbard | Aug. 14, 1956 |
| 2,812,909 | Dalton | Nov. 12, 1957 |